US009014903B1

(12) United States Patent
Zhu et al.

(10) Patent No.: US 9,014,903 B1
(45) Date of Patent: Apr. 21, 2015

(54) DETERMINATION OF OBJECT HEADING BASED ON POINT CLOUD

(75) Inventors: Jiajun Zhu, Sunnyvale, CA (US); Dmitri A. Dolgov, Mountain View, CA (US); Nathaniel Fairfield, Mountain View, CA (US)

(73) Assignee: Google Inc., Mountain View, CA (US)

( * ) Notice: Subject to any disclaimer, the term of this patent is extended or adjusted under 35 U.S.C. 154(b) by 386 days.

(21) Appl. No.: 13/477,871

(22) Filed: May 22, 2012

(51) Int. Cl.
| G05D 1/00 | (2006.01) |
| --- | --- |
| G05D 3/00 | (2006.01) |
| G01C 22/00 | (2006.01) |
| G05D 1/02 | (2006.01) |
| G06G 7/78 | (2006.01) |
| G08G 1/16 | (2006.01) |
| G01S 13/88 | (2006.01) |
| G06K 9/00 | (2006.01) |
| G01C 21/34 | (2006.01) |

(52) U.S. Cl.
CPC .................................. G01C 21/3446 (2013.01)

(58) Field of Classification Search
CPC ... G05D 1/024; G05D 1/0246; G05D 1/0242; G05D 1/0248; G05D 2201/0213; G01C 15/002; G01C 21/165; G01S 17/023; G01S 17/936; G01S 17/87; G06T 17/00; G06T 2200/04; G06T 2207/10028
USPC ............... 701/1, 2, 23, 27, 28, 200, 223, 300, 701/301, 400, 423, 514, 519; 382/100, 103, 382/104, 106, 107; 345/418, 419; 356/3, 356/508, 614
See application file for complete search history.

(56) References Cited

U.S. PATENT DOCUMENTS

| 4,926,171 | A | 5/1990 | Kelley | |
|---|---|---|---|---|
| 5,241,481 | A | 8/1993 | Olsen | |
| 6,741,363 | B1 | 5/2004 | Kaupert | |
| 7,502,688 | B2 | 3/2009 | Hirokawa | |
| 8,126,642 | B2 * | 2/2012 | Trepagnier et al. | 701/423 |
| 8,374,397 | B2 * | 2/2013 | Shpunt et al. | 382/106 |
| 2004/0178945 | A1 * | 9/2004 | Buchanan | 342/70 |
| 2010/0039318 | A1 | 2/2010 | Kmiecik | |
| 2010/0118116 | A1 | 5/2010 | Tomasz | |
| 2010/0296705 | A1 * | 11/2010 | Miksa et al. | 382/106 |
| 2010/0302247 | A1 * | 12/2010 | Perez et al. | 345/440 |
| 2011/0274343 | A1 | 11/2011 | Krishnaswamy | |
| 2012/0046820 | A1 * | 2/2012 | Allard et al. | 701/25 |
| 2014/0118716 | A1 * | 5/2014 | Kaganovich | 356/4.01 |

OTHER PUBLICATIONS

Fent et al., Implementation of Dynamic Obstacle Avoidance on the CMU NavLab, 1990, IEEE.*

* cited by examiner

*Primary Examiner* — Khoi Tran
*Assistant Examiner* — Robert Nguyen
(74) *Attorney, Agent, or Firm* — McDonnell Boehnen Hulbert & Berghoff LLP

(57) ABSTRACT

An autonomous vehicle configured to determine the heading of an object-of-interest based on a point cloud. An example computer-implemented method involves: (a) receiving spatial-point data indicating a set of spatial points, each spatial point representing a point in three dimensions, where the set of spatial points corresponds to an object-of-interest; (b) determining, for each spatial point, an associated projected point, each projected point representing a point in two dimensions; (c) determining a set of line segments based on the determined projected points, where each respective line segment connects at least two determined projected points; (d) determining an orientation of at least one determined line segment from the set of line segments; and (e) determining a heading of the object-of-interest based on at least the determined orientation.

30 Claims, 10 Drawing Sheets

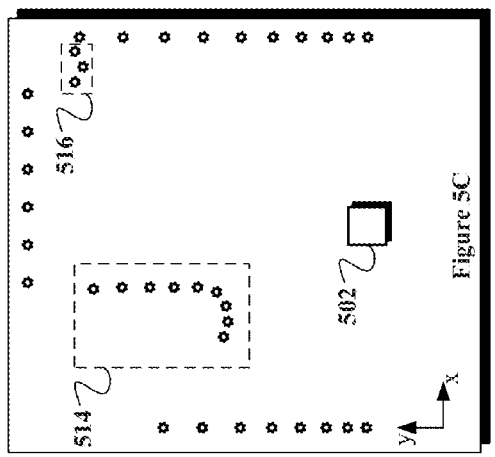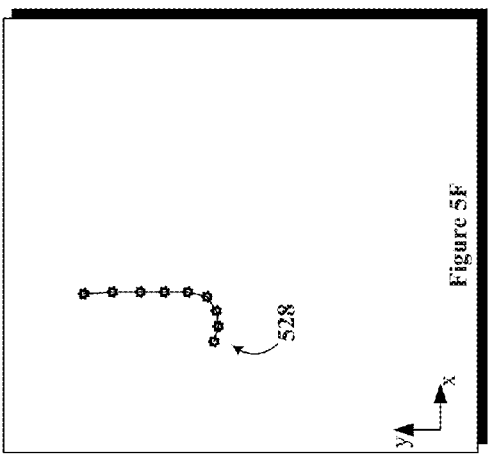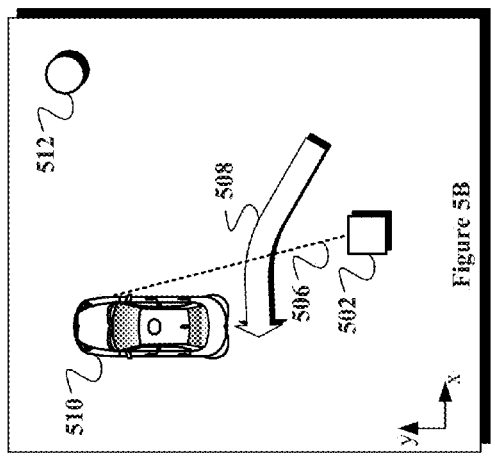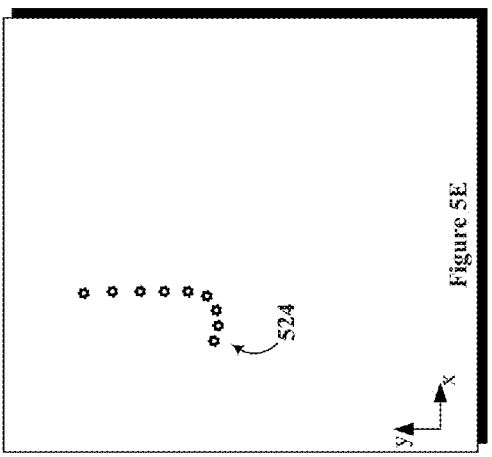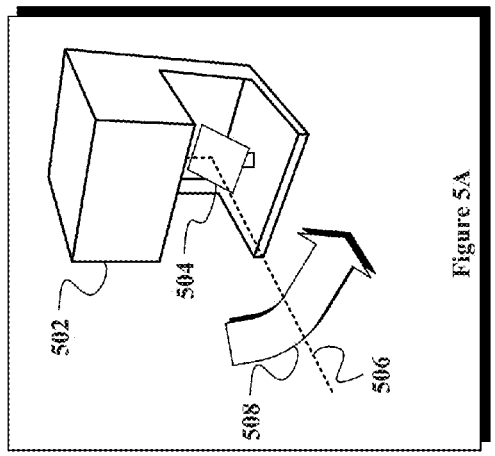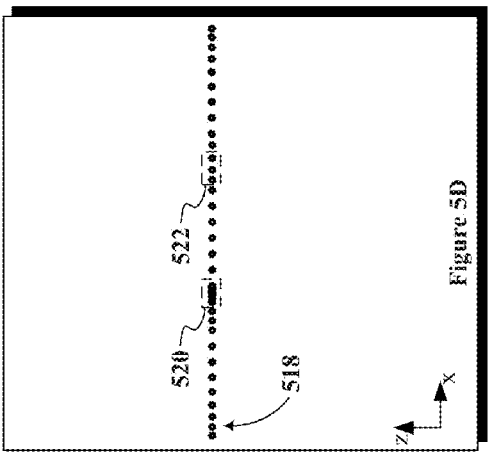

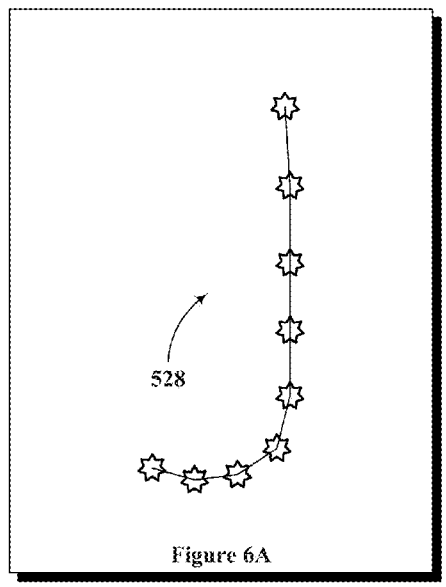
Figure 6A
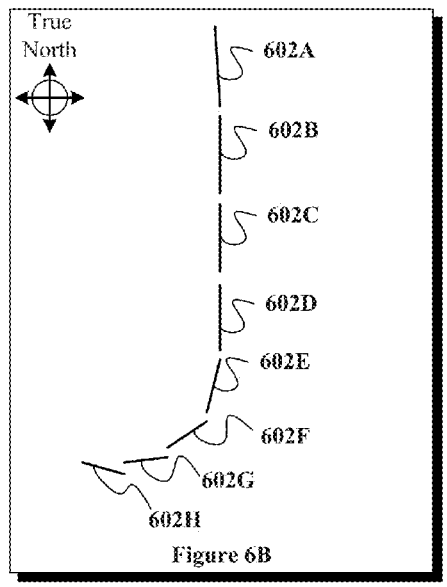
Figure 6B
| Line Segment | Angle |
|---|---|
| 602A | -2° |
| 602B | 0° |
| 602C | 0° |
| 602D | -1° |
| 602E | 3° |
| 602F | 45° |
| 602G | 75° |
| 602H | -70° |
Figure 6C
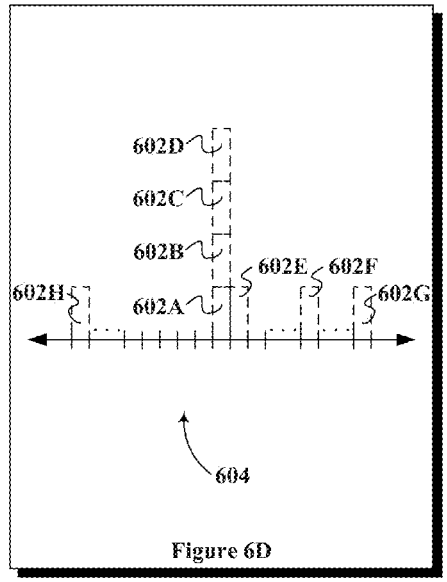
Figure 6D

US 9,014,903 B1

DETERMINATION OF OBJECT HEADING BASED ON POINT CLOUD

BACKGROUND

Unless otherwise indicated herein, the materials described in this section are not prior art to the claims in this application and are not admitted to be prior art by inclusion in this section.

Vehicles may be configured to operate in an autonomous mode in which the vehicle navigates through an environment with little or no input from a driver. Such a vehicle may include one or more sensors that are configured to sense information about the environment. The vehicle may use the sensed information to navigate through the environment. For example, if the sensors sense that the vehicle is approaching an obstacle, the vehicle may navigate around the obstacle.

In some instances the obstacle may be moving. Accordingly, it may be desirable to determine a heading (or direction) of the obstacle, so as to help ensure that the autonomous vehicle may avoid the moving obstacle, among other reasons. However, some techniques for determining the heading of a moving obstacle may be inaccurate, inefficient, and/or otherwise burdensome to carry out. An improvement is therefore desired.

SUMMARY

In one aspect, a computer-implemented method involves: (a) receiving spatial-point data indicating a set of spatial points, each spatial point representing a point in three dimensions, where the set of spatial points corresponds to an object-of-interest; (b) determining, for each spatial point, an associated projected point, each projected point representing a point in two dimensions; (c) determining a set of line segments based on the determined projected points, where each respective line segment connects at least two determined projected points; (d) determining an orientation of at least one determined line segment from the set of line segments; and (e) determining a heading of the object-of-interest based on at least the determined orientation.

In another aspect, an autonomous-vehicle system includes one or more sensors and a computer system. The vehicle system is configured to: (a) receive spatial-point data indicating a set of spatial points, each spatial point representing a point in three dimensions, where the set of spatial points corresponds to an object-of-interest; (b) determine, for each spatial point, an associated projected point, each projected point representing a point in two dimensions; (c) determine a set of line segments based on the determined projected points, where each respective line segment connects at least two determined projected points; (d) determine an orientation of at least one determined line segment from the set of line segments; and (e) determine a heading of the object-of-interest based on at least the determined orientation.

In yet another aspect, a non-transitory computer-readable medium has program instructions stored thereon that are executable by at least one processor. The program instructions include: (a) instructions for receiving spatial-point data indicating a set of spatial points, each spatial point representing a point in three dimensions, where the set of spatial points corresponds to an object-of-interest; (b) instructions for determining, for each spatial point, an associated projected point, each projected point representing a point in two dimensions; (c) instructions for determining a set of line segments based on the determined projected points, where each respective line segment connects at least two determined projected points; (d) instructions for determining an orientation of at least one determined line segment from the set of line segments; and (e) instructions for determining a heading of the object-of-interest based on at least the determined orientation.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIGS. 5A-5F depict aspects of determining an object heading based on a point cloud, according to an example embodiment.

FIG. 6A-6D depict further aspects of determining an object heading based on a point cloud, according to an example embodiment.

DETAILED DESCRIPTION

Figure 1:
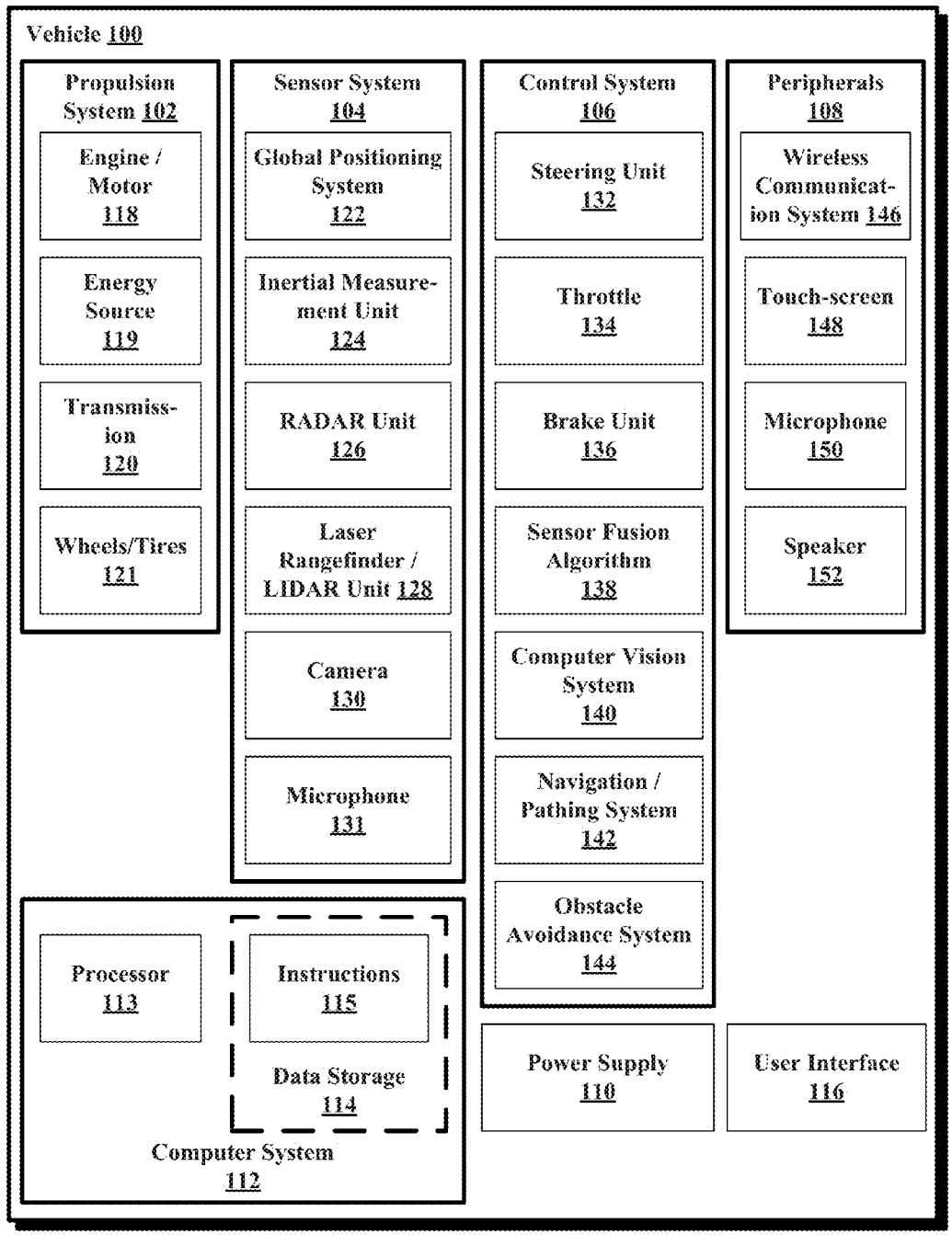
FIG. 1 is a functional block diagram depicting aspects of a vehicle, according to an example embodiment.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are contemplated herein.

Example embodiments may relate to an autonomous vehicle, such as a driverless automobile, that is configured to determine the heading of an object-of-interest (e.g., another vehicle) based on a point cloud (i.e., three-dimensional spatial-point data). More particularly, embodiments may implement techniques for projecting three-dimensional spatial-point data corresponding to the object-of-interest onto a two dimensional ground plane. Various line segments may be inferred between the projected points, and respective orientations of the line segments may be analyzed so as to approximate the heading of the object-of-interest. Such techniques may provide for accurate and/or efficient determination of the heading of the object-of-interest based on three-dimensional spatial-point data.

At a high level, the method may involve (i) receiving spatial-point data indicating a set of spatial points (i.e., a point cloud), (ii) determining, for each spatial point, an associated projected point, (iii) determining a set of line segments based on the determined projected points, (iv) determining an orientation of the determined line segments, and (v) determining a heading of the object-of-interest.

Receiving spatial-point data indicating a set of spatial points may involve receiving the spatial-point data from a rangefinder, or scanning laser, equipped to an autonomous vehicle. Each spatial point may represent a point in three dimensions, and the set of spatial points may correspond to the object-of-interest, as determined by the autonomous vehicle.

Determining, for each spatial point, an associated projected point, may involve determining, for each spatial point, an associated projected point representing a point in two dimensions. In this way, the three-dimensional spatial-point data may be transformed into two-dimensional point data. In an embodiment, each projected may represent a point in a ground plane. Accordingly, the set of projected points may provide an approximate outline of a portion of the object-in-interest from the perspective of the ground plane.

Determining a set of line segments based on the projected points may involve connecting successive projected points. In this way, the autonomous vehicle may determine a two-dimensional curve that is, in general, made up of line segments connecting the successive projected points.

Determining an orientation of the determined line segments may involve determining the orientation of one or more (e.g., all) of the determined line segments. In an embodiment, the orientation of the line segments may be determined relative to a predetermined direction, such as true north.

Determining a heading of the object-of-interest based on at least the determined orientation, may involve analyzing the collective orientation of all of the line segments for which an orientation was determined. For instance, determining the heading may involve creating a histogram of the orientation of the line segments. The line segments may be grouped into histogram intervals based on the respective determined orientation of each line segment. Then, the peak of the histogram may be selected as the heading of the object-of-interest.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 could be configured to operate fully or partially in an autonomous mode, and thus may be referred to as an "autonomous vehicle." For example, a computer system could control the vehicle 100 while in the autonomous mode, and may be operable to receive information from one or more sensors, upon which one or more control processes (such as the determination of a heading of an object-of-interest) for an autonomous vehicle are based.

It should be understood that an autonomous vehicle may be fully autonomous or partially autonomous. In a partially autonomous vehicle some functions may be manually controlled (e.g., by a person) some or all of the time. Further, a partially autonomous vehicle could be configured to switch between a fully-manual operation mode and a partially- or fully-autonomous operation mode.

The vehicle 100 could include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid vehicle could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, and/or other materials or combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, at least one camera 130, and/or at least one microphone 131. The sensor system 104 could also include sensors configured to monitor internal systems of the vehicle 100 (e.g., O₂ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the vehicle 100. To this end, GPS 122 could include a transceiver operable to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be a still camera or a video camera. In some embodiments, the camera 130 may be mechanically movable such as by rotating and/or tilting a platform to which the camera is mounted. As such, a control process of vehicle 100 may be implemented to control the movement of camera 130.

The sensor system 104 may also include a microphone 131. The microphone 131 may be configured to capture sound in the environment of vehicle 100. Further, in some implementations, a vehicle 100 may be configured to capture sound from the environment of vehicle 100. In some cases, multiple microphones may be arranged as a microphone array, or possibly as multiple microphone arrays.

The control system 106 may be configured to control operation of the vehicle 100 and its components. Accordingly, the control system 106 could include various elements, such as steering unit 132, throttle 134, brake unit 136, a sensor fusion algorithm 138, a computer vision system 140, a navigation/pathing system 142, and an obstacle avoidance system 144.

The steering unit 132 could represent any combination of mechanisms that may be operable to adjust the heading of vehicle 100.

The throttle 134 could be configured to control, for instance, the operating speed of the engine/motor 118 and, in turn, control the speed of the vehicle 100.

The brake unit 136 could include any combination of mechanisms configured to decelerate the vehicle 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of vehicle 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to allow interaction between the vehicle 100 and external sensors, other vehicles, other computer systems, and/or a user. For example, peripherals 108 could include a wireless communication system 146, a touchscreen 148, a microphone 150, and/or a speaker 152.

In an example embodiment, the peripherals 108 could provide, for instance, means for a user of the vehicle 100 to interact with the user interface 116. To this end, the touchscreen 148 could provide information to a user of vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to the user of the vehicle 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communication (DSRC) devices that could include public and/or private data communications between vehicles and/or roadside stations.

The power supply 110 may provide power to various components of vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the vehicle 100 and its subsystems.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The environment could include other vehicles, traffic lights, traffic signs, road markers, pedestrians, etc. The computer vision system 140 could recognize the various aspects of the environment based on object recognition models stored in data storage 114, or by using other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
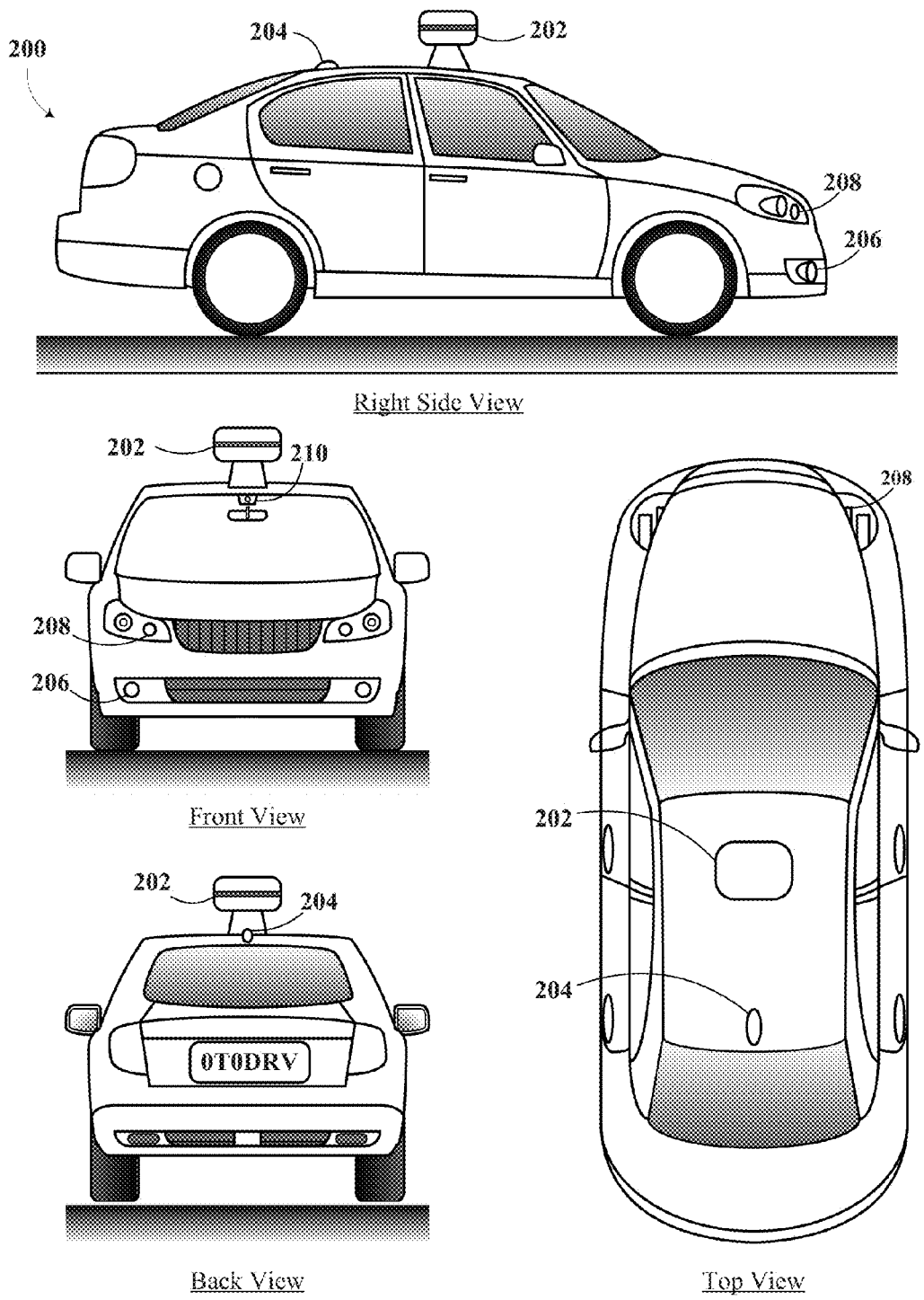
FIG. 2 depicts a vehicle, according to an example embodiment.

FIG. 2 shows a vehicle 200 that could be similar or identical to vehicle 100 described in reference to FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

Depending on the embodiment, vehicle 200 could include a sensor unit 202, a wireless communication system 204, a LIDAR unit 206, a laser rangefinder unit 208, and a camera 210. The elements of vehicle 200 could include some or all of the elements described for FIG. 1.

The sensor unit 202 could include one or more different sensors configured to capture information about an environment of the vehicle 200. For example, sensor unit 202 could include any combination of cameras, RADARs, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques.

For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine the distance to the points on the object. The predetermined light pattern may comprise infrared light, or light of another wavelength.

As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object.

As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated, the camera 210 could capture images from a forward-looking view with respect to the vehicle 200. Other mounting locations and viewing angles of camera 210 are possible, either inside or outside the vehicle 200.

The camera 210 could have associated optics that could be operable to provide an adjustable field of view. Further, the camera 210 could be mounted to vehicle 200 with a movable mount that could be operable to vary a pointing angle of the camera 210.

Figure 3:
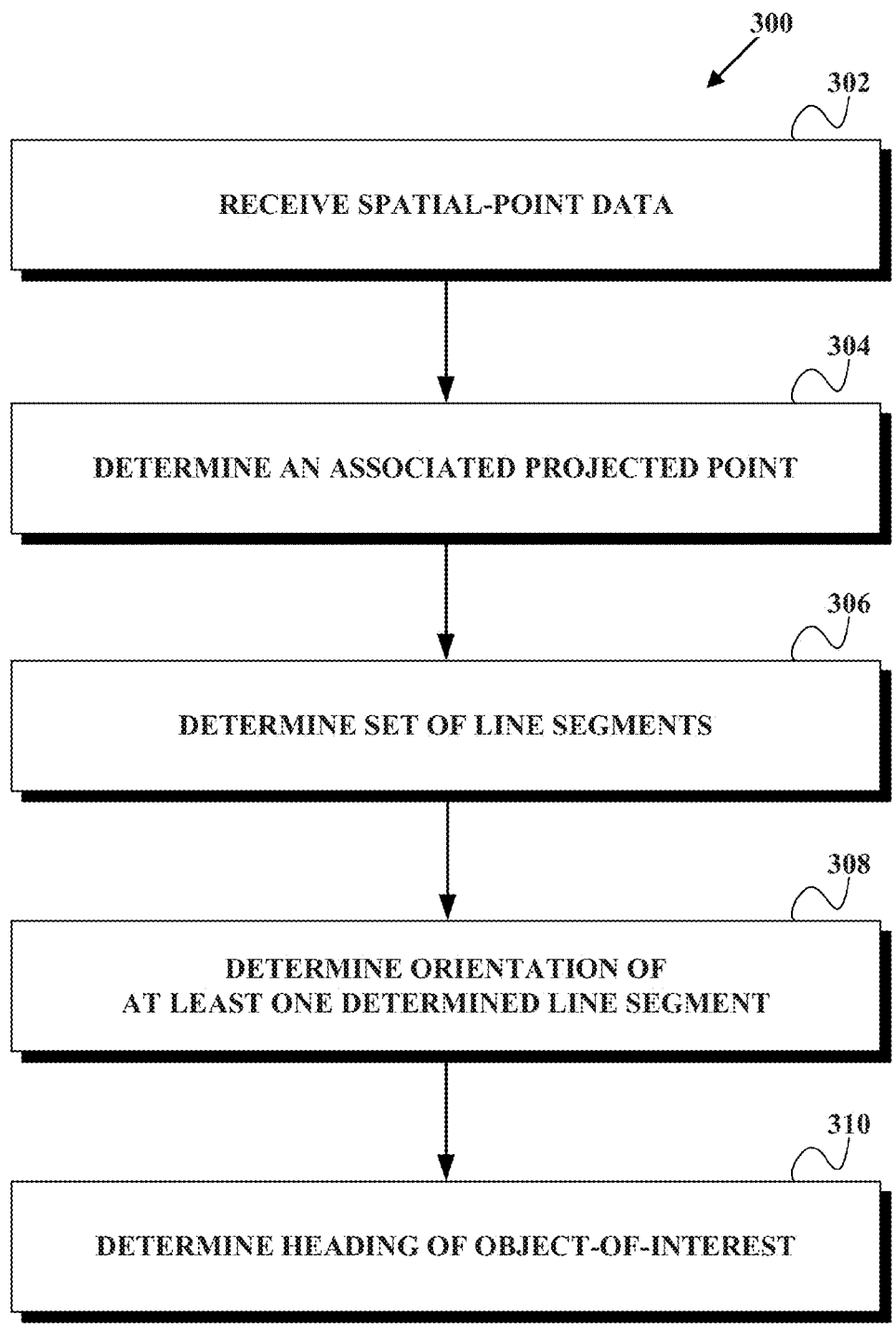
FIG. 3 is a simplified flow chart depicting a method, according to an example embodiment.

FIG. 3 is a flow chart depicting an example method 300 for determining a heading of an object-of-interest based on a point cloud. Method 300 is described by way of example as being carried out by an autonomous vehicle. More particularly, method 300 may be carried out by a system or subsystem of an autonomous vehicle, such as any of the features of the vehicle shown in FIGS. 1 and 2 as described above. However, it should be understood that the example methods described herein, such as method 300, may be carried out by other autonomous vehicles, systems, or subsystems.

Furthermore, those skilled in the art will understand that the flowchart described herein depicts functionality and operation of certain implementations of example embodiments. In this regard, each block of the flowchart may represent a module, a segment, or a portion of program code, which includes one or more instructions executable by a processor (e.g., processor 113 described above with respect to computer system 112) for implementing specific logical functions or steps in the process. The program code may be stored on any type of computer readable medium (e.g., computer readable storage medium or non-transitory media, such as data storage 114 described above with respect to computer system 112), for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

As shown by block 302, method 300 involves an autonomous vehicle receiving spatial-point data indicating a set of spatial points, each spatial point representing a point in three dimensions, where the set of spatial points corresponds to an object-of-interest. At block 304, the autonomous vehicle determines, for each spatial point, an associated projected point, each projected point representing a point in two dimensions. At block 306, the autonomous vehicle determines a set of line segments based on the determined projected points, where each respective line segment connects at least two determined projected points. At block 308, the autonomous vehicle determines an orientation of at least one determined line segment from the set of line segments. And at block 310, the autonomous vehicle determines a heading of the object-of-interest based on at least the determined orientation.

At block 302, method 300 involves an autonomous vehicle receiving spatial-point data indicating a set of spatial points, each spatial point representing a point in three dimensions, where the set of spatial points corresponds to an object-of-interest. As will be discussed further below, each spatial point may be associated with a respective laser from a set of lasers and a respective timestamp.

For purposes of context, example, and explanation, an overview of general approaches to object detection is provided below. It should be understood, however, that object detection may be performed in other ways in accordance with the disclosure herein, and the object-detection discussion herein should not be taken to be limiting. Further, for purposes of context, example, and explanation, aspects of operation of an example rangefinder are discussed below. It should be understood, however, that other aspects and examples of the operation of a rangefinder may exist and that the aspects of rangefinder operation discussed herein should not be taken to be limiting.

As noted above, example vehicle 100 may include a laser rangefinder or LIDAR unit 128 ("rangefinder 128"). As a general matter, rangefinder 128 may be used to detect objects near and/or around vehicle 100. More specifically, rangefinder 128 may be configured to capture laser point cloud images using one or more lasers. Such laser point cloud images may include one or more images made up of laser points representing a predetermined view angle near and/or around vehicle 100. For example, the laser point cloud images may include one or more laser point cloud images representing a 360 degree view around vehicle 100. The laser point cloud image may include a predetermined number of laser points, such as 50,000 laser points, 80,000 laser points, 100,000 laser points, or any other suitable number of laser points. Further rangefinder 128 may be configured to capture one or more laser point cloud images at predetermined time intervals, such as 10 fps, 30 fps, every millisecond, every second, or at any other suitable time interval.

Data storage 114 of computer system 112 of vehicle 100 may store object-detector software, code, or other program instructions. Such object-detector software may include, or be part of, one or more of the control systems 106 described above, including computer vision system 140 and/or obstacle avoidance system 144. The object detector may be any configuration of software and/or hardware configured to detect an object in an image (such as a laser point cloud image) captured by one or more of the sensors in sensor system 104 (such as rangefinder 128). As a laser point cloud image is captured by rangefinder 128, the image may be communicated to the object detector, which may analyze the image to determine whether there is an object present in the laser point cloud image. The object in the captured laser point cloud image may be any type of object including, for example, a vehicle, pedestrian, road sign, traffic light, or traffic cone, among other examples.

To determine whether an object is present in a laser point cloud image, the object detector may leverage one or more image parameters. The image parameters may instruct the object detector when an arrangement of laser points should be considered an object. The image parameters may also instruct the object detector as how to classify the object.

Rangefinder 128 may be associated with a particular set of image parameters (e.g., a particular set of image parameters that may be different from those associated with RADAR Unit 126, or Camera 130). Examples of such laser parameters may include the height of a pedestrian, the length of a vehicle object, or an obstacle-detection threshold, among other examples.

When the object detector detects an object in an image, the object detector may define an object label for the detected object. The object label may be defined by a bounding box encompassing the object. Alternatively, the object label may be defined by a bounding oval or other suitable bounding shape.

The object label may have one or more object label parameters that define the shape of the object label. Assuming that the shape of the object label is a bounding box, the object label parameters may include a height parameter that defines the height of the bounding box (e.g., in pixels), a width parameter that defines the width of the bounding box (e.g., in pixels), a first pixel coordinate that defines the latitude placement of the bounding box (e.g., an X-coordinate), and a second pixel coordinate that defines the longitudinal placement of the bounding box (e.g., a Y-coordinate). Especially where the sensor that captured the image is rangefinder 128, the object label parameters may also include a third pixel coordinate that defines the physical height of the object or a particular laser point depicted in the captured image (e.g., a Z-coordinate).

Further, the object label applied by the object detector may be associated with an image frame number that identifies the image in which the detected object may be located. As a moving object may be located in a number of images, such as a moving vehicle, the moving object may appear in different locations in different images. Therefore, the moving object may have a number of different object labels associated with it, and each of the object labels may be associated with a corresponding image number to identify the location of the moving object across multiple images.

The vehicle 100 may also be in communication with an object-identification server. The object-identification server may be operative to verify the objects detected by vehicle 100 using the object detector. Moreover, the object-identification server may facilitate the optimization of one or more of the parameters used by the object detector to detect objects in the captured laser point cloud image. In one embodiment, vehicle 100 may communicate the object labels, and their corresponding object label parameters, to the object identification server for verification that the object labels were correctly, or sufficiently correctly, applied to objects appearing in one or more of the captured laser point cloud images.

As noted above, FIG. 2 depicts vehicle 200 including a sensor unit 202. Sensor unit 202 may include a laser rangefinder or LIDAR unit 128 ("rangefinder 128"). A particular laser included in rangefinder 128 may have a range of approximately 150 meters, a thirty degree vertical field of view, and approximately a thirty degree horizontal field of view. The particular laser, and/or additional lasers included in rangefinder 128, may have alternative ranges and field of views as well. For example, a particular laser may have a range of approximately 50-80 meters, a thirty degree vertical field of view, and a 360 degree horizontal field of view. It should be understood that the ranges and field of views discussed above are discussed for purposes of example and explanation only, and should not be taken to be limiting. Other examples of ranges and field of views may exist as well.

Sensor unit 102 may implement any of the range detection and/or laser scanning techniques described above. For example, sensor unit 202 may provide vehicle 200 with range and intensity information that processor 113 may use to identify the location and distance of various objects. In one aspect, sensor unit 202 may measure the distance between vehicle 200 and the object surfaces facing vehicle 200 by spinning one or more lasers on their axes and/or changing their pitch.

Figure 4A:
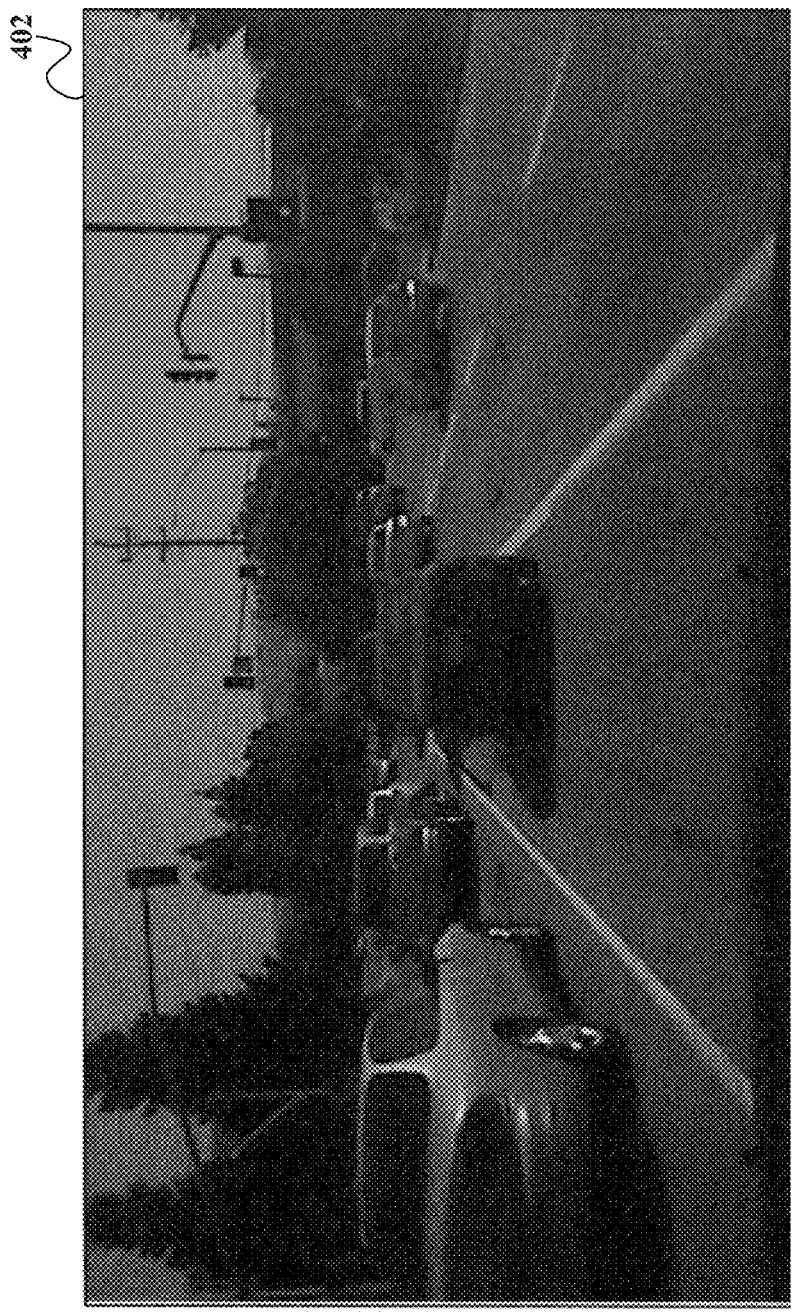
FIGS. 4A-4D depict various captured images, according to an example embodiment.
Figure 4B:
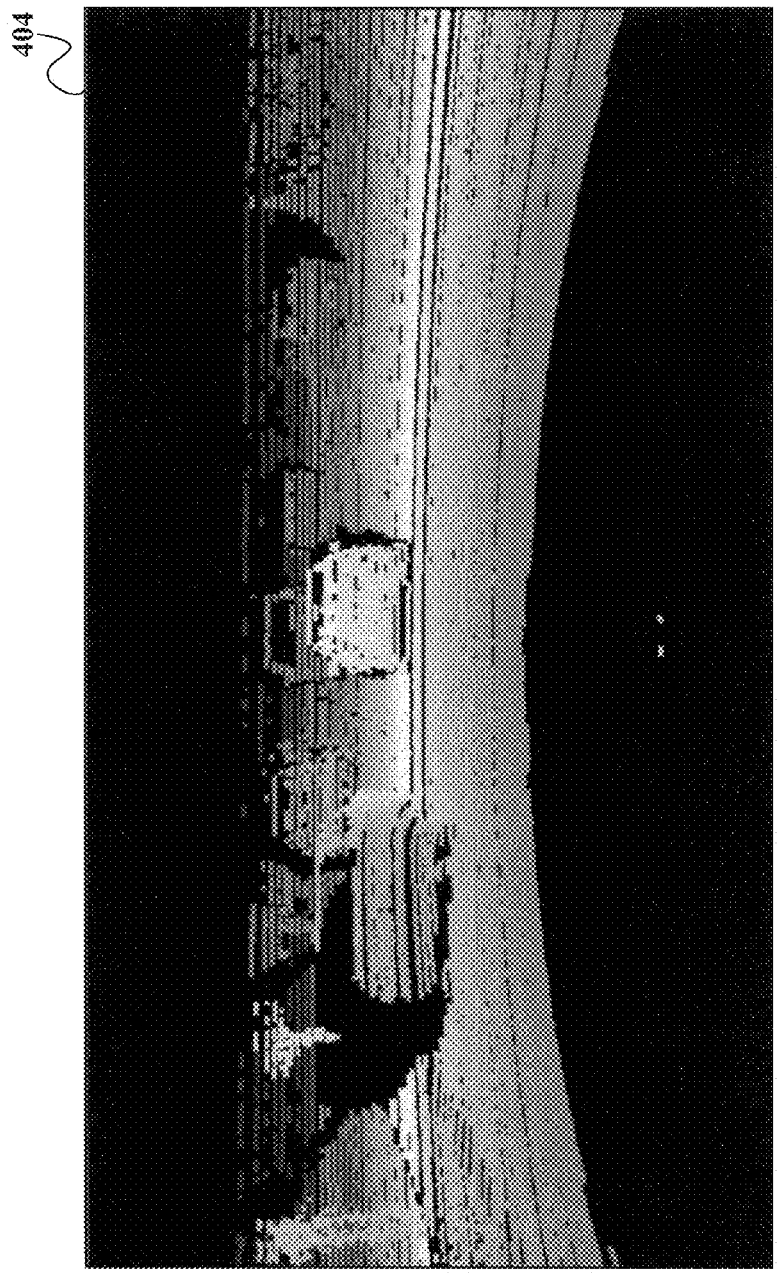
Figure 4C:
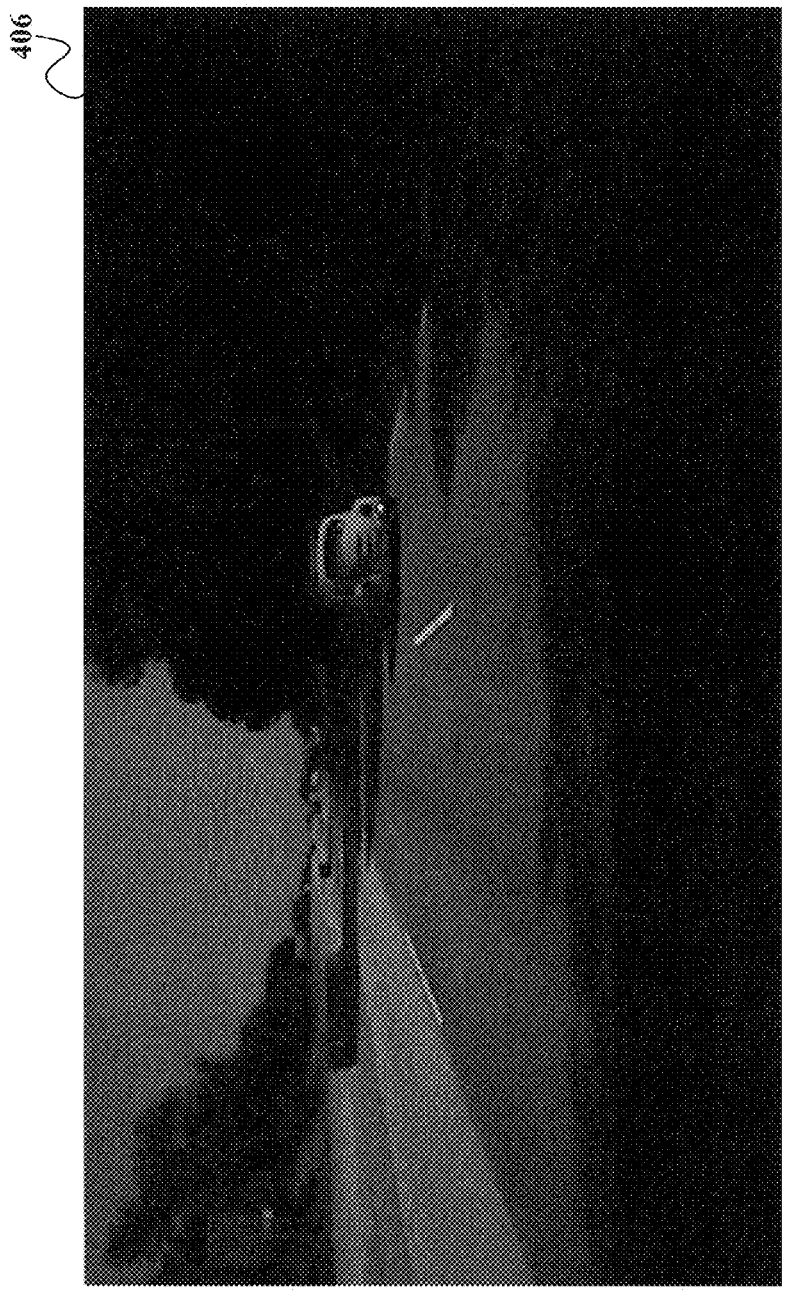
Figure 4D:
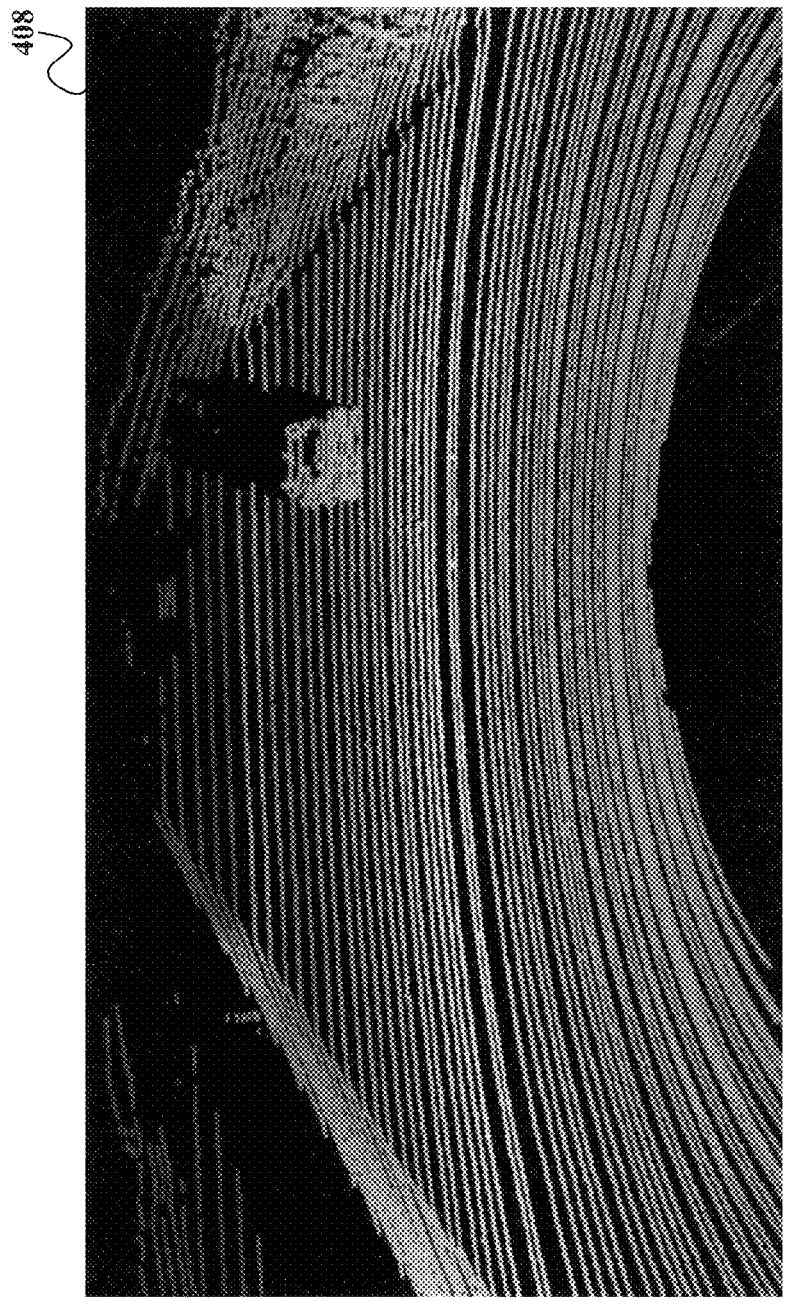

FIGS. 4A-4D are examples of various images that may be captured by one or more sensors mounted on vehicle 100. FIG. 4A is a first example of a raw camera image 402 captured by one or more of cameras 130. FIG. 4B is an example of a laser point cloud image 404 of the view shown in the first raw camera image 402. FIG. 4C is a second example of a raw camera image 406 captured by one or more of cameras 130. FIG. 4D is an example of a laser point cloud image 408 of the view shown in raw camera image 406.

As shown in the examples of FIGS. 4B and 4D, a laser point cloud image may substantially or approximately correspond to a raw camera image captured by a camera. Moreover, FIGS. 4B and 4D show that vehicle 200 may be configured to capture more than one type of laser point cloud image. Vehicle 200 may also be configured to capture other types of perspectives using other types of sensors as well. As a general matter, each "line" depicted in FIGS. 4B and 4D may correspond to a series of spatial points collected by a particular, single, laser of rangefinder 128.

Returning to method 300, recall that, as shown by block 302, method 300 involves an autonomous vehicle receiving spatial-point data indicating a set of spatial points, each spatial point representing a point in three dimensions, where the set of spatial points corresponds to an object-of-interest.

In general, the spatial-point data may be received by any suitable sensor including, for example, any sensor in sensor system 104, sensor unit 202, and/or LIDAR unit 206, among other examples. Further, the receipt of spatial-point data may be accomplished in accordance with any of the object detection or rangefinder operation techniques discussed generally above. Other techniques and/or approaches for receiving spatial-point data may exist as well.

For purposes of example and explanation, FIGS. 5A-5F depict aspects of determining an object heading based on a point cloud, including receiving spatial-point data. More particularly, FIG. 5A provides a simplified depiction of an example rangefinder 502. FIG. 5B provides a simplified depiction of rangefinder 502 operating in an example vehicular environment. FIG. 5C provides a simplified depiction of a ground-plane view of the received spatial-point data. And FIG. 5D provides a simplified depiction of a viewing-plane view of the received spatial-point data.

With respect to FIG. 5A, example rangefinder 502 is shown as including a mirror 504 and laser beam 506. As shown by motion arrow 508, mirror 504 is configured so as to be rotatable about its axis; accordingly laser beam 506 may be directed in a circular range of motion about rangefinder 502. Although rangefinder 502 is depicted as having (approximately) a 180 degree viewing angle, this is for purposes of example and explanation only and should not be taken be limiting. Indeed, as explained above, rangefinder 502 may be configured to have any desirable viewing angle, including any viewing angle up to and including 360 degrees. Further, although rangefinder 502 is depicted as having only a single laser beam and a single mirror, this is for purposes of example and explanation only and should not be taken to be limiting. Indeed, as explained above, rangefinder 502 may include any desirable number of laser beams. Similarly, rangefinder 502 may include various sensors (not shown) arranged to detect the reflection of laser beam 506 off of various objects in the environment. Such sensors may be located elsewhere on the autonomous vehicle as well.

With respect to FIG. 5B, example rangefinder 502 may operate in a vehicular environment so as to receive spatial-point data corresponding to the vehicular environment. The example vehicular environment depicted in Figure SB includes vehicle 510 as well as tree 512. In operation, rangefinder 502 rotates about its viewing angle according to motion arrow 508. While rotating, rangefinder 502 regularly emits laser beam 506, and reflections of laser beam 506 by objects in the environment, such as vehicle 510 and tree 512, may be received by suitable sensors.

For example, with respect to FIG. 5C, various spatial-point data (represented by stars) are shown from a ground-plane (or aerial) perspective. Note that some spatial-point data, such as vehicle spatial-point data 514, are shown as corresponding to vehicle 510. And some spatial-point data, such as tree spatial-point data 516, are shown as corresponding to tree 512. Other spatial-point data are shown as corresponding to the boundary of FIG. 5C, though this is for purposes of example and explanation only. It should be understood that such other spatial-point data, in a more realistic environment, may generally indicate the presence (or absence) of an object within a given viewing range of rangefinder 502.

Vehicle spatial-point data 514 may be identified as corresponding to vehicle 510 in accordance with any suitable object-detection technique, including any of those object-detection techniques described above. Similarly, tree spatial data 516 may be identified as corresponding to tree 514 in accordance with any suitable object-detection technique. Further, in accordance with the disclosure herein, one or more of the objects detected may be identified as an "object-of-interest." For instance, as an object that is moving, vehicle 510 (or vehicle spatial-point data 514) may be identified as an object-of-interest. Objects may be identified as an object-of-interest based on any additional or alternative attributes or characteristics as well.

Further, as noted above, each spatial point may be associated with a respective laser from a set of lasers and a respective timestamp. That is, in an embodiment where rangefinder 502 includes multiple lasers, each respective received spatial point may be associated with the particular laser that was detected in accordance with the respective received spatial point. Additionally, each respective spatial point may be associated with a respective timestamp (e.g., a time at which laser was emitted or received). In this way, the received spatial points may be organized, identified, or otherwise ordered on a spatial (laser identification) and/or temporal (timestamp) basis. Such an ordering may assist or improve an analysis of the spatial-point data by helping to organize the spatial-point data into a meaningful order.

FIG. 5D provides a simplified depiction of a viewing-plane view of the received spatial-point data 518. As shown, the viewing-plane view of the spatial-point data 518 is characterized by varying densities of the spatial-point data; those points "nearer" spatially to rangefinder 502 having a relatively higher density, those points corresponding to relatively near objects (such as spatial-point data 520 and 522, corresponding to vehicle 510 and tree 512, respectively) having a relatively higher density, and those points corresponding to relatively far, or no objects, having a relatively lower density.

Note that the viewing-plane view of the spatial-point data corresponds to spatial-point data acquired via a single laser and from the perspective of rangefinder 502 (or a vehicle that rangefinder 502 may be attached to). While spatial-point data 518 is shown as generally linear in the viewing-plane view (i.e., generally parallel to the ground plane), this is not necessary, nor is it necessarily a realistic depiction of such spatial-point data. Indeed, as can be seen in FIGS. 4B and 4D, realistic spatial-point data corresponding to a single laser may take a generally non-linear form from the perspective of the viewing plane.

At block 304, method 300 involves the autonomous vehicle determining, for each spatial point, an associated projected point, each projected point representing a point in two dimensions. Generally, each projected point representing a point in two dimensions may represent a point in a ground plane.

For example, with reference to FIG. 5E, each spatial point associated with object-of-interest vehicle 510 is shown as a respective one of projected points 524, which have been projected onto the ground plane. Such a projection may generally be accomplished by using any suitable three dimensional to two dimensional projection technique. In one basic approach to such a projection, the "z dimension" or "height" component of each three-dimensional spatial point may be removed, resulting in a set of spatial points having only two-dimensional components: an "x component" and a "y component." Other three dimensional to two dimensional projection techniques, including more sophisticated projection techniques, may exist and may be used in accordance with the disclosure herein as well.

Further, before determining, for each spatial point, an associated projected point, the autonomous vehicle may sort the set of spatial points based on at least (i) the respective laser and (ii) the respective timestamp associated with each spatial point. As noted above, in this way, the received spatial points may be organized, identified, or otherwise ordered on a spatial (laser identification) and/or temporal (timestamp) basis. Such an ordering may assist or improve an analysis of the spatial-point data to the extent the spatial-point data is not already ordered in a desirable manner.

At block 306, method 300 involves the autonomous vehicle determining a set of line segments based on the determined projected points, where each respective line segment connects at least two determined projected points. As a general matter, block 306 may include connecting each of the successive projected points 524 with a respective line segment. For instance, as shown in FIG. 5F, each of the successive projected points 524 may be connected by a respective line segment such that the line segments, taken together, form a two-dimensional curve, such as two-dimensional curve 528.

It should be understood that although the examples described with respect to FIGS. 5A-5F refer to example spatial points and projected points acquired based on a single laser, as noted above, similar spatial points and projected points may be acquired based on additional lasers as well. Note that such multiple-laser arrangements are reflected in the point clouds depicted in FIGS. 4B and 4D. In such a case, multiple sets of spatial points and projected points may ultimately be analyzed, resulting in improved accuracy and fidelity in the analysis of the autonomous vehicles environment.

Accordingly, the set of spatial points received by the autonomous vehicle may include at least two subsets of spatial points, where (i) no two subsets of spatial points include spatial points associated with the same respective laser and (ii) the spatial points within each subset of spatial points are associated with the same respective laser. In other words, the set of spatial points received by the autonomous vehicle may include multiple subsets of spatial points, each subset of spatial points associated with a different respective laser.

Further, therefore, determining the set of line segments in accordance with block 306 may include, for each given subset of spatial points, determining a respective two-dimensional curve based on projected points associated with the spatial points within the given subset of spatial points. That is, for each subset of spatial points associated with a different respective laser that is received by the autonomous vehicle, the autonomous vehicle may determine respective projected points and a respective two-dimensional curve. Ultimately, the autonomous vehicle may determine a subset of line segments based on each respective two-dimensional curve. That is, for each subset of spatial points associated with a different respective laser that is received by the autonomous vehicle, the autonomous vehicle may determine a subset of line segments, similar to those making up two-dimensional curve 528. (As will be discussed further below, example two-dimensional curve 528 and example set of line segments 602A-602H, are also shown in FIG. 6A and FIG. 6B, respectively).

Further still, before determining the subset of line segments, the autonomous vehicle may determine an approximated-two-dimensional curve for each respective two-dimensional curve. In general, the approximated-two-dimensional curve may contain fewer projected points than the respective two-dimensional curve. Any suitable curve-approximation algorithm may be used to determine the approximated-two-dimensional curve. In an example embodiment, the Ramer-Douglas-Peucker algorithm may be used to determine the approximated-two-dimensional curve, though this is not necessary. Other examples of suitable approximation algorithms may exist as well.

As a general matter, determining the approximated-two-dimensional curve may serve the beneficial purpose of removing noise that may be present in the original two-dimensional curve. Such noise may be present due to inherent noise characteristics of rangefinder 128 and/or noise due to the angle of receipt of the spatial-point data by rangefinder 128. Other sources of noise may exist as well. By removing "noisy" point data, the orientation of the resulting line segments may be more accurately used to determine the heading of the object-of-interest.

At block 308, method 300 involves the autonomous vehicle determining an orientation of at least one determined line segment from the set of line segments.

For purposes of example and explanation, FIG. 6A depicts a detailed view of two-dimensional curve 528. Correspondingly, FIG. 6B depicts a detailed view of line segments 602A-602H (in an "exploded view"), which make up two-dimensional curve 528. In accordance with block 308, the autonomous vehicle may determine an orientation of each of line segments 602A-602H.

The orientation of each of line segments 602A-602H may be determined in any suitable format, and relative to any suitable point of reference. For example and without limitation, the orientation may be determined in degrees, radians, and/or any suitable coordinate designation. Further, for example and without limitation, the orientation may be determined relative to an orientation of the autonomous vehicle carrying out method 300 and/or relative to true north. Other examples of formats and/or points of reference for determination of the orientation of line segments 602A-602H may exist as well.

By way of example and explanation, FIG. 6C depicts approximate determined orientations of each of line segments 602A-602H. In particular, line segment 602A is depicted as having an approximate orientation of negative two degrees relative to true north, line segment 602B is depicted as having an approximate orientation of zero degrees relative to true north; line segment 602C is depicted as having an approximate orientation of zero degrees relative to true north, line segment 602D is depicted as having an approximate orientation of negative one degree relative to true north, line segment 602E is depicted as having an approximate orientation of three degrees relative to true north, line segment 602F is depicted as having an approximate orientation of negative forty-five degrees relative to true north, line segment 602G is depicted as having an approximate orientation of negative seventy-five degrees relative to true north, and line segment 602H is depicted as having an approximate orientation of negative seventy degrees relative to true north. It should be understood that the orientations depicted in FIG. 6C are provided for purposes of example and explanation, are not necessarily intended to correspond to accurate or realistic orientations, and should not be taken to be limiting.

At block 310, method 300 involves the autonomous vehicle determining a heading of the object-of-interest based on at least the determined orientation. As a general matter, the heading of the object-of-interest may be determined based on each of, or some subset of, the orientations of the line segments determined in accordance with block 308.

As one example, determining the heading of the object-of-interest may involve creating a histogram based on the orientation of the line segments. The line segments may be grouped into histogram intervals based on at least the respective determined orientation of each line segment. Then, the orientation associated with the peak of the histogram may be selected as the heading of the object-of-interest.

For instance, FIG. 6D depicts line segments 602A-602H sorted into histogram 604 based on their respective determined orientations. Histogram 604 is shown as including intervals of five degrees, centered around an orientation of zero degrees relative to true north. Accordingly, line segments 602A (negative two degrees). 602B (zero degrees), 602C (zero degrees), and 602D (negative one degree), are each grouped into the histogram interval associated with negative two and a half degrees to positive two and a half degrees. Line segment 602E (three degrees) is grouped into the histogram interval associated with two and a half degrees to seven and a half degrees. And each of 602F (forty-five degrees), 602G (seventy-five degrees), and (602H seventy degrees) are associated with histogram intervals relatively further away from zero degrees.

As can be seen by reference to FIG. 6D, the histogram interval centered about zero degrees, and associated with negative two and a half degrees to positive two and a half degrees, corresponds to the peak of the histogram. As such, the orientation of the object-of-interest may be selected as some value corresponding to negative two and a half degrees to positive two and a half degrees.

For example, the orientation of the object-of-interest may be approximated as the range from negative two and a half degrees to positive two and a half degrees. As another example, the orientation of the object-of-interest may be approximated as the minimum, maximum, median, or average of those values within the peak histogram interval. As yet another example, the orientation of the object-of-interest may be approximated as the minimum, maximum, or middle value of the peak histogram interval itself. Other examples of selecting the orientation of the object-of-interest based on histogram 604 may exist as well.

Note that although the example shown in FIG. 6D includes a histogram having intervals of five degrees, other interval ranges may be used as well. For instance, in some embodiments the histogram intervals may be one-half degree. Other examples of suitable histogram intervals may exist as well.

Other approaches to determining the heading of the object-of-interest based on line segments 602A-602H may exist as well. As one example, an average of the orientations of line segments 602A-602H may be used. As another example, a curve may be fit to the orientations of line segments 602A-602H, and the peak of the fitted curve may be used. Other suitable curve-fitting or interpolation techniques may be used as well.

Figure 7:
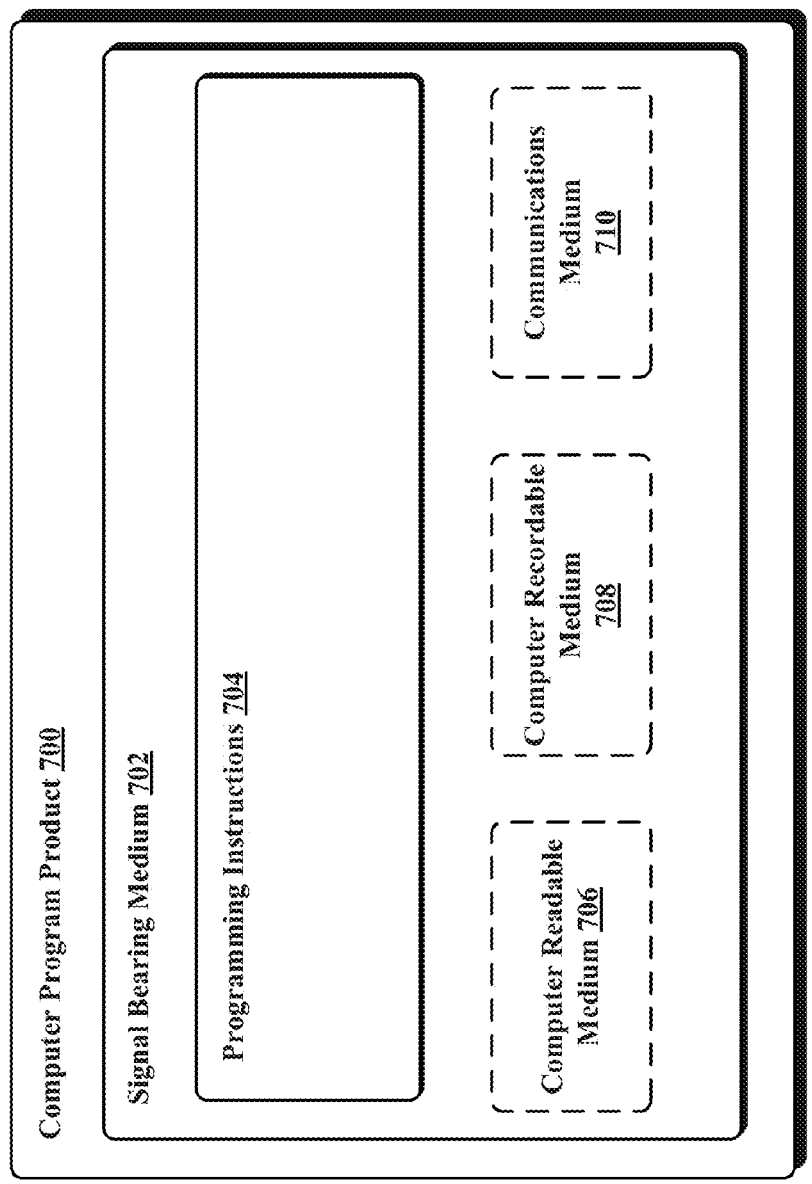
FIG. 7 depicts an example computer-readable medium, according to an example embodiment.

As noted above, in some embodiments, the disclosed methods may be implemented by computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may encompass a computer-readable medium 606, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 may be configured to provide various operations, functions, or actions in response to the programming instructions 704 conveyed to the computer system 112 by one or more of the computer readable medium 706, the computer recordable medium 708, and/or the communications medium 710.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

The invention claimed is:

1. A computer-implemented method comprising:
receiving, by a computer system from a LIDAR unit, spatial-point data indicating a set of spatial points, each spatial point representing a point in three dimensions, wherein the set of spatial points corresponds to an object-of-interest;
determining, for each spatial point, an associated projected point, each projected point representing a point in two dimensions;
determining a set of line segments based on the determined projected points, wherein each respective line segment connects at least two determined projected points;
determining an orientation of at least one determined line segment from the set of line segments;
determining a heading of the object-of-interest based on at least the determined orientation; and
controlling a vehicle, by the computer system, based on the determined heading of the object-of-interest.

2. The method of claim 1, wherein each spatial point is associated with (i) a respective laser from a set of lasers and (ii) a respective timestamp.

3. The method of claim 1, wherein each projected point representing a point in two dimensions represents a point in a ground plane.

4. The method of claim 3, further comprising:
before determining, for each spatial point, an associated projected point, sorting the set of spatial points based on at least (i) the respective laser and (ii) the respective timestamp associated with each spatial point.

5. The method of claim 3, wherein the set of spatial points comprises at least two subsets of spatial points, wherein (i) no two subsets of spatial points comprise spatial points associated with the same respective laser and (ii) the spatial points within each subset of spatial points are associated with the same respective laser, and wherein determining the set of line segments comprises:
for each given subset of spatial points, determining a respective two-dimensional curve based on projected points associated with the spatial points within the given subset of spatial points; and determining a subset of line segments based on each respective two-dimensional curve.

6. The method of claim 5, wherein determining the set of line segments further comprises:
before determining the subset of line segments, determining an approximated-two-dimensional curve for each respective two-dimensional curve, wherein the approximated-two-dimensional curve contains fewer spatial points than the respective two-dimensional curve.

7. The method of claim 1, wherein determining the orientation of at least one line segment comprises determining the orientation of at least one line segment relative to a predetermined direction.

8. The method of claim 1, wherein determining the heading of the object-of-interest comprises:
creating a histogram of line segments, wherein the line segments are grouped into histogram intervals based on at least the respective determined orientation of each line segment; and
selecting, as the heading of the object-of-interest, a peak of the histogram.

9. The method of claim 1, wherein the histogram intervals are one-half degree.

10. The method of claim 1, wherein determining the heading of the object-of-interest comprises:
determining a curve, wherein the curve is an approximate fit of the determined orientation of the at least one line segment; and
selecting, as the heading of the object-of-interest, a peak of the curve.

11. A non-transitory computer-readable medium having program instructions stored thereon that are executable by at least one processor, the program instructions comprising:
instructions for receiving, from a LIDAR unit, spatial-point data indicating a set of spatial points, each spatial point representing a point in three dimensions, wherein the set of spatial points corresponds to an object-of-interest;
instructions for determining, for each spatial point, an associated projected point, each projected point representing a point in two dimensions;
instructions for determining a set of line segments based on the determined projected points, wherein each respective line segment connects at least two determined projected points;
instructions for determining an orientation of at least one determined line segment from the set of line segments;
instructions for determining a heading of the object-of-interest based on at least the determined orientation; and
instructions for controlling a vehicle based on the determined heading of the object-of-interest.

12. The non-transitory computer-readable medium of claim 11, wherein each spatial point is associated with (i) a respective laser from a set of lasers and (ii) a respective timestamp.

13. The non-transitory computer-readable medium of claim 11, wherein each projected point representing a point in two dimensions represents a point in a ground plane.

14. The non-transitory computer-readable medium of claim 13, the program instructions further comprising:
instructions for, before determining, for each spatial point, an associated projected point, sorting the set of spatial points based on at least (i) the respective laser and (ii) the respective timestamp associated with each spatial point.

15. The non-transitory computer-readable medium of claim 13, wherein the set of spatial points comprises at least two subsets of spatial points, wherein (i) no two subsets of spatial points comprise spatial points associated with the same respective laser and (ii) the spatial points within each subset of spatial points are associated with the same respective laser, and wherein the instructions for determining the set of line segments comprise:
instructions for, for each given subset of spatial points, determining a respective two-dimensional curve based on projected points associated with the spatial points within the given subset of spatial points; and
instructions for determining a subset of line segments based on each respective two-dimensional curve.

16. The non-transitory computer-readable medium of claim 15, wherein the instructions for determining the set of line segments further comprise:
instructions for, before determining the subset of line segments, determining an approximated-two-dimensional curve for each respective two-dimensional curve, wherein the approximated-two-dimensional curve contains fewer spatial points than the respective two-dimensional curve.

17. The non-transitory computer-readable medium of claim 11, wherein determining the orientation of at least one line segment comprises determining the orientation of at least one line segment relative to a predetermined direction.

18. The non-transitory computer-readable medium of claim 11, wherein the instructions for determining the heading of the object-of-interest comprise:
instructions for creating a histogram of line segments, wherein the line segments are grouped into histogram intervals based on at least the respective determined orientation of each line segment; and
instructions for selecting, as the heading of the object-of-interest, a peak of the histogram.

19. The non-transitory computer-readable medium of claim 11, wherein the histogram intervals are one-half degree.

20. The non-transitory computer-readable medium of claim 11, wherein the instructions for determining the heading of the object-of-interest comprise:
instructions for determining a curve, wherein the curve is an approximate fit of the determined orientation of the at least one line segment; and
instructions for selecting, as the heading of the object-of-interest, a peak of the curve.

21. An autonomous-vehicle system comprising:
one or more sensors;
a computer system configured to:
receive spatial-point data indicating a set of spatial points, each spatial point representing a point in three dimensions, wherein the set of spatial points corresponds to an object-of-interest;
determine, for each spatial point, an associated projected point, each projected point representing a point in two dimensions;
determine a set of line segments based on the determined projected points, wherein each respective line segment connects at least two determined projected points;
determine an orientation of at least one determined line segment from the set of line segments; and
determine a heading of the object-of-interest based on at least the determined orientation.

22. The system of claim 21, wherein each spatial point is associated with (i) a respective laser from a set of lasers and (ii) a respective timestamp.

23. The system of claim 21, wherein each projected point representing a point in two dimensions represents a point in a ground plane.

24. The system of claim 23, wherein the computer system is further configured to:
- before determining, for each spatial point, an associated projected point, sort the set of spatial points based on at least (i) the respective laser and (ii) the respective timestamp associated with each spatial point.

25. The system of claim 23, wherein the set of spatial points comprises at least two subsets of spatial points, wherein (i) no two subsets of spatial points comprise spatial points associated with the same respective laser and (ii) the spatial points within each subset of spatial points are associated with the same respective laser, and wherein, to determine the set of line segments, the computer system is configured to:
- for each given subset of spatial points, determine a respective two-dimensional curve based on projected points associated with the spatial points within the given subset of spatial points; and
- determine a subset of line segments based on each respective two-dimensional curve.

26. The system of claim 25, wherein, to determine the set of line segments, the computer system is configured to:
- before determining the subset of line segments, determine an approximated-two-dimensional curve for each respective two-dimensional curve, wherein the approximated-two-dimensional curve contains fewer spatial points than the respective two-dimensional curve.

27. The system of claim 21, wherein determining the orientation of at least one line segment comprises determining the orientation of at least one line segment relative to a predetermined direction.

28. The system of claim 21, wherein, to determine the heading of the object-of-interest, the computer system is configured to:
- create a histogram of line segments, wherein the line segments are grouped into histogram intervals based on at least the respective determined orientation of each line segment; and
- select, as the heading of the object-of-interest, a peak of the histogram.

29. The system of claim 21, wherein the histogram intervals are one-half degree.

30. The system of claim 21, wherein, to determine the heading of the object-of-interest, the computer system is configured to:
- determine a curve, wherein the curve is an approximate fit of the determined orientation of the at least one line segment; and
- select, as the heading of the object-of-interest, a peak of the curve.

* * * * *